United States Patent
Skotnicki

(10) Patent No.: US 8,378,558 B2
(45) Date of Patent: Feb. 19, 2013

(54) THERMOELECTRIC GENERATOR

(75) Inventor: Thomas Skotnicki, Crolles-Montfort (FR)

(73) Assignee: STMicroelectronics (Crolles) SAS, Crolles (FR)

( * ) Notice: Subject to any disclaimer, the term of this patent is extended or adjusted under 35 U.S.C. 154(b) by 299 days.

(21) Appl. No.: 12/911,287

(22) Filed: Oct. 25, 2010

(65) Prior Publication Data

US 2011/0095655 A1    Apr. 28, 2011

(30) Foreign Application Priority Data

Oct. 26, 2009  (FR) ...................................... 09 57493

(51) Int. Cl.
*H01L 41/113* (2006.01)
*H02N 11/00* (2006.01)

(52) U.S. Cl. ........................................ 310/339; 322/2 R
(58) Field of Classification Search ................... 310/339; 322/2 R See application file for complete search history.

(56) References Cited

U.S. PATENT DOCUMENTS

| | | | | |
|---|---|---|---|---|
| 2,522,389 A * | 9/1950 | Mason | ...................... | 310/323.01 |
| 2,531,230 A * | 11/1950 | Mason | .......................... | 290/1 R |
| 4,053,859 A | 10/1977 | Hollweck | | |
| 5,039,901 A * | 8/1991 | Newbould | ..................... | 310/339 |
| 7,453,187 B2 * | 11/2008 | Richards et al. | .............. | 310/339 |
| 2003/0122448 A1 | 7/2003 | Kim et al. | | |
| 2003/0160543 A1 | 8/2003 | Lee et al. | | |
| 2004/0150298 A1 | 8/2004 | Styblo et al. | | |
| 2005/0093398 A1 | 5/2005 | Kim et al. | | |
| 2010/0037624 A1 * | 2/2010 | Epstein et al. | ................... | 62/3.1 |

FOREIGN PATENT DOCUMENTS

| | | |
|---|---|---|
| BE | 515499 A | 8/1954 |
| DE | 102005025094 A1 | 12/2006 |
| WO | WO 2005/074494 A2 | 8/2005 |

OTHER PUBLICATIONS

French Search Report dated Apr. 14, 2010 from corresponding French Application No. 09/57493.
French Search Report dated Apr. 15, 2010 from related French Application No. 09/57490.
Xu C. et al., *Design of a Micro Heat Engine*, Technical Digest, Micro-Electro-Mechanical Systems (MEMS), vol. 2, pp. 261-267, Nov. 5, 2000.
P.S. Glockner et al., *Recent advances in nano-electromechanical and microfluidic power generation*, International Journal of Energy Research, vol. 31, No. 6-7, pp. 603-618, May 2007.

* cited by examiner

*Primary Examiner* — Thomas M Dougherty
(74) *Attorney, Agent, or Firm* — Wolf, Greenfield & Sacks, P.C.

(57) ABSTRACT

A thermoelectric generator including, between first and second walls delimiting a tightly closed space, a layer of a piezoelectric material connected to output terminals; a plurality of openings crossing the piezoelectric layer and emerging into first and second cavities close to the first and second walls; and in the tight space, drops of a liquid, the first wall being capable of being in contact with a hot source having a temperature greater than the evaporation temperature of the liquid and the second wall being capable of being in contact with a cold source having a temperature smaller than the evaporation temperature of the liquid.

22 Claims, 1 Drawing Sheet

THERMOELECTRIC GENERATOR

CROSS REFERENCE TO RELATED APPLICATIONS

This application claims the priority benefit of French patent application number 09/57493, filed on Oct. 26, 2009, entitled "THERMOELECTRIC GENERATOR," which is hereby incorporated by reference to the maximum extent allowable by law.

BACKGROUND OF THE INVENTION

1. Field of the Invention

The present invention relates to a thermoelectric generator, that is, a device capable of generating electricity from a heat source. It especially aims at the exploitation of the thermal power generated by certain types of equipment, for example, a hot surface of an integrated circuit chip, a car muffler, the roof of a house, or any other hot surface.

2. Discussion of the Related Art

In certain mobile devices, for example, telephones, watches, or pacemakers, the use of piezoelectric microgenerators has been provided to generate electricity from the mechanical vibrations resulting from the user's movements. This enables to at least partially recharge the device batteries. A disadvantage of such a solution is that it cannot be used in the case of fixed equipment, for example, a television set or a computer.

Devices capable of directly converting heat into electricity by the Seebeck effect have also been provided. It has indeed been observed that a potential difference appears at the junction of two conductive materials submitted to a temperature difference. However, such devices have a very low efficiency. In practice, the use of the Seebeck effect is mainly limited to temperature measurement applications.

Thermoelectric generators with microturbines have further been provided, which for example comprise turbines having a diameter on the order of 4 mm and capable of being integrated in electronic components. However, such devices are expensive since they comprise rotating mechanical portions which are difficult to form.

SUMMARY OF THE INVENTION

Thus, an object of an embodiment of the present invention is to provide a thermoelectric generator overcoming at least some of the disadvantages of prior art solutions.

An object of an embodiment of the present invention is to provide such a generator which is easy to manufacture.

An object of an embodiment of the present invention is to provide such a generator which is easy to integrate in conventional equipment.

Thus, an embodiment of the present invention provides a thermoelectric generator comprising, between first and second walls delimiting a tightly closed space, a layer of a piezoelectric material connected to output terminals; a plurality of openings crossing the piezoelectric layer and emerging into first and second cavities close to the first and second walls; and in the tight space, drops of a liquid, the first wall being capable of being in contact with a hot source having a temperature greater than the evaporation temperature of the liquid and the second wall being capable of being in contact with a cold source having a temperature smaller than the evaporation temperature of the liquid.

According to an embodiment of the present invention, the tight space is at a pressure different from the atmospheric pressure.

According to an embodiment of the present invention, the liquid comprises water.

According to an embodiment of the present invention, the liquid comprises an alcohol.

According to an embodiment of the present invention, a first dielectric layer is interposed between the piezoelectric layer and the first cavity and a second dielectric layer is interposed between the piezoelectric layer and the second cavity.

According to an embodiment of the present invention, the openings are through holes having a diameter ranging from 100 nm to 1 μm.

According to an embodiment of the present invention, the generator is capable of being assembled on an integrated circuit chip.

According to an embodiment of the present invention, the generator is formed in a radiator capable of being assembled on an integrated circuit chip.

According to an embodiment of the present invention, the generator is capable of being assembled on a hot surface of a car, for example, a silencer.

According to an embodiment of the present invention, the generator is capable of being assembled in a battery charger.

The foregoing objects, features, and advantages of the present invention will be discussed in detail in the following non-limiting description of specific embodiments in connection with the accompanying drawings.

DETAILED DESCRIPTION

Figure 1A:
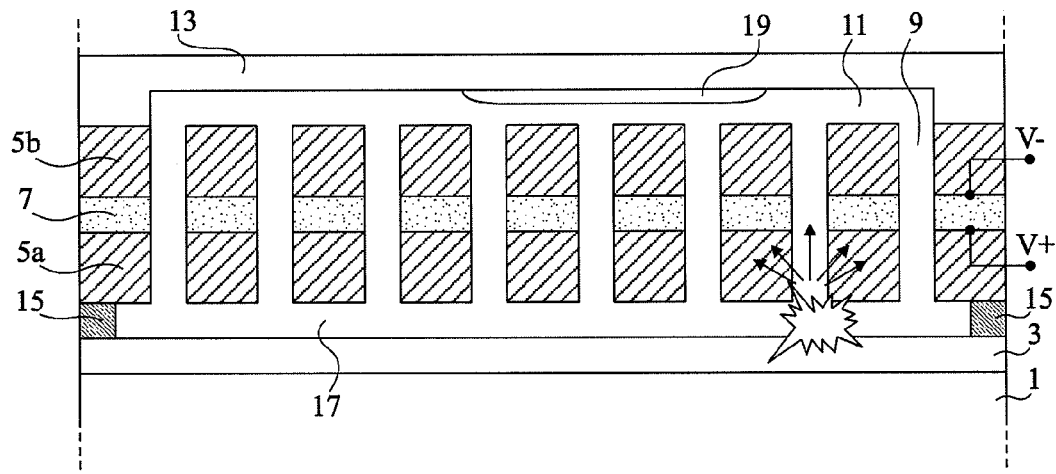
FIGS. 1A to 1C are simplified cross-section views illustrating an embodiment of a thermoelectric generator and its operating principle.

For clarity, the same elements have been designated with the same reference numerals in the different drawings and, further, the various drawings are not to scale.

An aspect of an embodiment of the present invention is to provide a device capable of:

converting thermal power into mechanical power by means of a liquid abruptly evaporating when it comes in contact with a hot surface, thus creating a local overpressure; and converting this overpressure into electric power by means of a piezoelectric element.

Figure 1B:
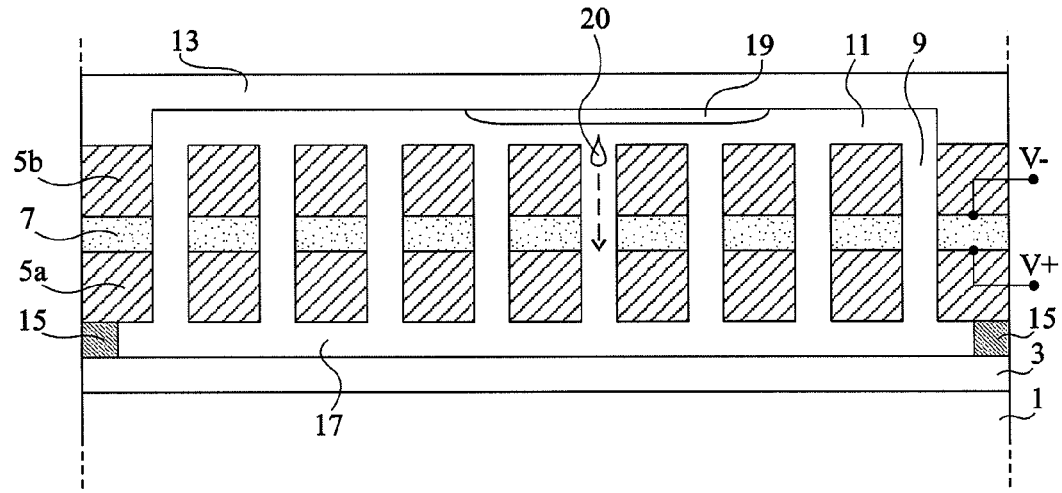
Figure 1C:
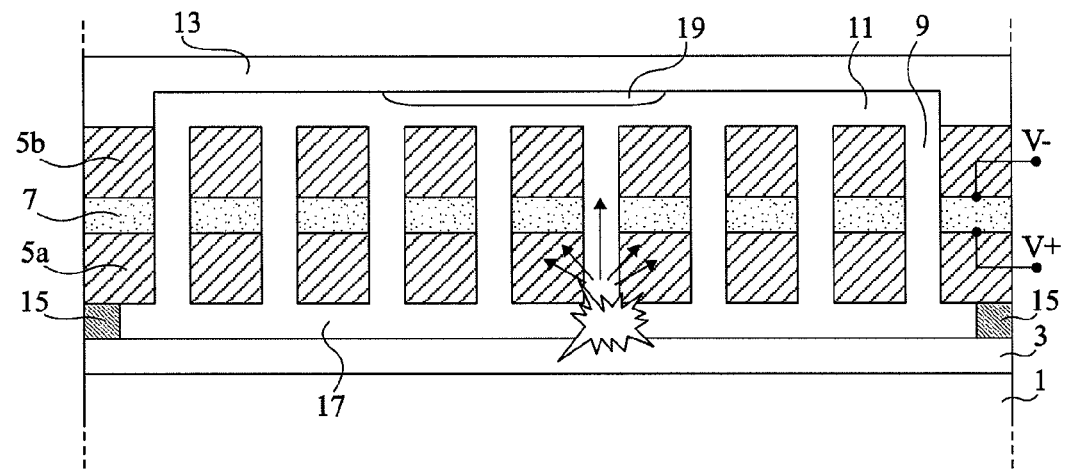

FIGS. 1A to 1C are simplified cross-section views illustrating an embodiment of a thermoelectric generator and its operating principle.

In this example, the thermoelectric generator is formed at the surface of an integrated circuit chip formed inside and on top of a semiconductor substrate 1 and comprising, at the surface of the substrate, a stack 3 of conductive interconnect layers and of insulating layers. In operation, the integrated circuit chip generates heat, and its upper surface for example reaches a temperature ranging between 60 and 125° C.

The thermoelectric generator comprises, above a hot horizontal wall formed by upper surface 3 of the integrated circuit chip, a stack of a lower dielectric layer 5a, of a metalized piezoelectric layer 7, and of an upper dielectric layer 5b. The stack of layers 5a, 7, and 5b is crossed by a network of vertical openings 9, for example, through holes with a circular cross-section of small diameter. As an example, dielectric layers 5a and 5b may have a thickness ranging between 1 and 50 μm, for example, on the order of 20 µm, the piezoelectric layer may have a thickness ranging between 0.1 and 30 µm, for example, on the order of 1 µm, and the through holes may have a diameter ranging between 0.1 and 1 µm.

An upper cavity 11, for example, having a height substantially equal to the diameter of holes 9, interconnects holes 9 by their top portion. The assembly formed by layers 5a, 7, 5b and cavity 11 is covered with a cap 13 tightly closing cavity 11 and forming a cold wall of the generator. Cap 13 may, for example, extend in fins (not shown), the above-described structure then corresponding to the low portion of a radiator capable of being assembled on an integrated circuit chip.

On the hot side, a tight ring 15 interposed between dielectric layer 5a and the hot wall is provided. Ring 15 delimits a lower cavity 17 interconnecting through holes 9 by their bottom portion. The height of cavity 17 may be substantially equal to the diameter of holes 9.

In the space formed by openings 9 and cavities 11 and 17, a liquid 19 is introduced before the sealing. Liquid 19 is selected so that its boiling temperature is smaller than the temperature of hot wall 3 (in operation) and greater than the temperature of cold wall 13 (in operation).

As an example, ethanol or methanol, having boiling temperatures respectively on the order of 78° C. and 65° C. at the atmospheric pressure, may be used. Water or any other liquid may also be used and the tightly closed space formed by the cavities and the openings may be set to a pressure selected to obtain the desired boiling temperature.

As illustrated in FIG. 1A, when a drop of liquid 19 runs down along an opening 9 and reaches hot surface 3, it abruptly changes from the liquid state to the gaseous state. This fast state change locally generates a high overpressure and strong mechanical stress in the low portion of the material delimiting opening 9. Such stress is especially due to the small dimensions of openings 9 and to the small height of cavity 17. The strength of such a fast boiling phenomenon in a confined space can easily be conceived when observing the lifting effect caused by the presence of water droplets between a saucepan and a hot electric cooking plate.

Such mechanical stress is transmitted to piezoelectric layer 7 which transforms it into an electric signal. Metal electrodes (not shown) connected to output terminals $V_+$ and $V_-$ may be formed, on the lower and upper surfaces of layers 7.

After the fast evaporation step, the vapor condenses on the side of cold wall 13. An accumulation of liquid 19 thus forms on this wall, as illustrated in FIG. 1B. When the mass of liquid 19 increases, drops 20 fall back into openings 9 towards the hot wall.

FIG. 1C illustrates again the phenomenon of abrupt boiling/evaporation of a drop having fallen on hot wall 3, and the resulting mechanical stress.

In practice, due to the large number of holes 9, the falling of drops and their fast evaporation is almost regular. As an example, if a thermoelectric generator assembled on a square chip having a 1-cm side is considered, an interval of 10 µm between two holes may be provided, that is, a total on the order of $10^6$ holes distributed over the chip surface.

According to an advantage of the provided embodiment, the phenomenon of liquid evaporation may enable a much better cooling of the hot wall (for example, an integrated circuit chip) than with a conventional radiator.

As an example, the above-described thermoelectric generator may be formed from the planar upper surface of a radiator capable of being assembled on an integrated circuit chip. In this case, to form the generator, the radiator will be flipped. The embodiment may comprise the steps of:

depositing thermally conductive layer 13, for example, a metal layer, on the lower surface of the radiator, this metal layer comprising a recess to form cavity 11;

depositing, in the recess, a sacrificial layer for example having a thickness ranging between 100 nm and 1 µm;

forming by successive depositions a stack of a dielectric layer 5b, of a thin electrode layer, of a piezoelectric layer 7, of a thin electrode layer, and of a dielectric layer 5a;

drilling vertical openings 9 crossing the stack of layers thus formed and reaching the sacrificial layer, for example, according to a deep anisotropic etch method; and removing the sacrificial layer to form cavity 11, for example, according to an isotropic plasma etch or chemical etch method.

The structure thus formed may be placed, with the radiator associated therewith, on the integrated circuit chip, to form the thermoelectric generator. The forming of tight cavity 17 is ensured by a tight ring 15. During this assembly, drops of liquid 19 are introduced into the space left free by cavities 11 and 17 and openings 9. It may also be provided, during this assembly, to set this free space to an adapted pressure to adjust the boiling temperature of liquid 19.

According to an alternative embodiment, not shown, it may be provided to form the thermoelectric generator from the upper surface of an integrated circuit chip. As an example, a set of methods, currently designated in the art as "Above IC", enabling to integrate elements, for example, RF filters, directly at the surface of the upper insulation layer (passivation layer) of an integrated circuit chip, may be used for this purpose. In this case, tight ring 15, instead of being provided between the lower portion of the generator and the integrated circuit chip, will be provided between the upper portion of the generator and the cold surface, for example, the chip package.

Specific embodiments of the present invention have been described. Different variations and modifications will occur to those skilled in the art.

In particular, a thermoelectric generator in which a piezoelectric element enables converting mechanical stress caused by the abrupt boiling of a liquid in a confined space into electric power has been described. It will be within the abilities of those skilled in the art to provide any other layout of the piezoelectric material. As an example, a plurality of thin superposed piezoelectric layers, with thin electrodes alternately connected to output terminals $V_+$ and $V_-$ separating the piezoelectric layers, may be provided.

The provision of dielectric layers interposed on each side of the piezoelectric layer, between the piezoelectric layer and the lower and upper cavities of the structure, has also been provided. These layers especially have the function of insulating the piezoelectric layer from the generator structure. However, these layers are optional.

Further, the use of vertical through holes with a cylindrical cross-section to have a liquid flow between the hot wall and the cold wall of the generator has been mentioned hereabove. Any other arrangement and/or any other shape of the openings connecting the hot and cold walls of the generator may be provided.

Further, the present invention is not limited to the use of an integrated circuit chip as a heat source to operate the thermoelectric generator. As an example, the generator may be assembled in a package comprising a hot wall and a cold wall, the hot wall being capable of coming into contact with a hot surface such as a metal wall of a car silencer, a braking device of a vehicle, the roof of a house, or any other heat source. The generator may for example be assembled in a battery charger capable of recharging batteries from a heat source.

Further, the present invention is not limited to the embodiment mentioned hereabove as an example, nor to the dimensions provided hereabove. The thermoelectric generator may especially have much larger dimensions, for example, with a side length approximately ranging from a few centimeters to a few tens of centimeters, but also lower dimensions, for example, on the order of a few hundreds of nanometers.

Similarly, the provision of cavities 11 and 17 having a height substantially equal to the diameter of the vertical openings crossing the piezoelectric layer has been mentioned in relation with FIGS. 1A to 1C. Cavities 11 and 17 having a height much greater than the diameter of the holes may also be provided.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A thermoelectric generator comprising:
    between first and second walls delimiting a tightly closed space, a layer of a piezoelectric material connected to output terminals;
    a plurality of openings crossing the piezoelectric layer and emerging into first and second cavities close to the first and second walls; and
    in said tightly closed space a liquid,
    wherein the first wall is adapted to be in contact with a hot source having a temperature greater than the evaporation temperature of the liquid and the second wall is adapted to be in contact with a cold source having a temperature smaller than the evaporation temperature of the liquid.

2. The generator of claim 1, wherein said tightly closed space is at a pressure different from atmospheric pressure.

3. The generator of claim 1, wherein the liquid comprises water.

4. The generator of claim 1, wherein the liquid comprises an alcohol.

5. The generator of claim 1, wherein a first dielectric layer is interposed between the piezoelectric layer and the first cavity and a second dielectric layer is interposed between the piezoelectric layer and the second cavity.

6. The generator of claim 1, wherein said openings are through holes having a diameter in a range between about 100 nm and about 1 µm.

7. The generator of claim 1, in combination with an integrated circuit chip, wherein the generator is assembled on the integrated circuit chip.

8. The generator of claim 1, adapted to be assembled on a hot surface of a car.

9. The generator of claim 1, adapted to be assembled in a battery charger.

10. The generator of claim 8, adapted to be assembled on a car silencer.

11. A thermoelectric generator comprising:
    a first wall adapted to be in contact with a hot source and a second wall adapted to be in contact with a cold source;
    at least a layer of piezoelectric material located between the first and second wall, the at least a layer of piezoelectric material connected to output terminals;
    a network of openings crossing the at least a layer of piezoelectric material, the network of openings interconnected by a first cavity and a second cavity adjacent to the first wall and second wall respectively, the network of openings and first and second cavities forming a tightly closed space; and
    a liquid disposed within the tightly closed space.

12. The generator of claims 11, wherein the network of openings are through holes each with a circular cross-section.

13. The generator of claim 12, wherein the through holes have a diameter in a range between about 100 nm and about 1 µm.

14. The generator of claim 12, wherein the first and second cavity each have a height substantially equal to a diameter of the through holes.

15. The generator of claim 11, wherein said tightly closed space is at a pressure different from atmospheric pressure.

16. The generator of claim 11, wherein the liquid comprises water.

17. The generator of claim 11, wherein the liquid comprises an alcohol.

18. The generator of claim 11, wherein a first dielectric layer is interposed between the piezoelectric layer and the first cavity and a second dielectric layer is interposed between the piezoelectric layer and the second cavity.

19. The generator of claim 11, in combination with an integrated circuit chip, wherein the generator is assembled on the integrated circuit chip.

20. The generator of claim 11, adapted to be assembled on a hot surface of a car.

21. The generator of claim 20, adapted to be assembled on a car silencer.

22. The generator of claim 11, adapted to be assembled in a battery charger.

* * * * *